(12) United States Patent
Nishiguchi et al.

(10) Patent No.: US 10,667,167 B2
(45) Date of Patent: May 26, 2020

(54) COMMUNICATION CONTROL APPARATUS, COMMUNICATION CONTROL SYSTEM, COMMUNICATION CONTROL METHOD, AND RECORDING MEDIUM

(71) Applicant: FUJITSU LIMITED, Kawasaki-shi, Kanagawa (JP)

(72) Inventors: Yuki Nishiguchi, Kawasaki (JP); Ai Yano, Kawasaki (JP); Shigeki Fukuta, Setagaya (JP); Nami Nagata, Kawasaki (JP); Jun Kakuta, Yokohama (JP); Ryuichi Matsukura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 27 days.

(21) Appl. No.: 15/981,261

(22) Filed: May 16, 2018

(65) Prior Publication Data
US 2018/0338263 A1 Nov. 22, 2018

(30) Foreign Application Priority Data
May 17, 2017 (JP) .................. 2017-098344

(51) Int. Cl.
| | |
|---|---|
| *H04W 28/02* | (2009.01) |
| *H04L 29/08* | (2006.01) |
| *H04W 28/06* | (2009.01) |
| *H04L 29/06* | (2006.01) |
| *H04W 4/38* | (2018.01) |
| *H04W 4/80* | (2018.01) |

(52) U.S. Cl.
CPC ......... *H04W 28/0236* (2013.01); *H04L 67/12* (2013.01); *H04L 69/22* (2013.01); *H04W 4/38* (2018.02); *H04W 28/065* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 5,191,583 | A * | 3/1993 | Pearson | H04L 1/0007 370/242 |
| 8,351,372 | B2 * | 1/2013 | Padovani | H04B 7/264 370/328 |
| 10,277,512 | B1 * | 4/2019 | Williams | H04L 47/122 |
| 2002/0141448 | A1 * | 10/2002 | Matsunaga | H04L 29/06 370/469 |
| 2003/0147369 | A1 * | 8/2003 | Singh | H04L 1/0007 370/338 |
| 2003/0152058 | A1 * | 8/2003 | Cimini, Jr. | H04L 47/10 370/338 |
| 2003/0219034 | A1 * | 11/2003 | Lotter | H04L 41/0823 370/469 |

(Continued)

FOREIGN PATENT DOCUMENTS

| | | | |
|---|---|---|---|
| CN | 103716137 A | * | 4/2014 |
| JP | 2012-257016 | | 12/2012 |

*Primary Examiner* — Jamaal Henson
(74) *Attorney, Agent, or Firm* — Fujitsu Patent Center (57) ABSTRACT

A communication control apparatus includes: a processor configured to: fix a number of sets of data to be inserted into one packet by a communication apparatus according to a wireless quality with the communication apparatus; and notify the communication apparatus of the number of sets fixed at the fixing.

5 Claims, 6 Drawing Sheets

(56) References Cited

U.S. PATENT DOCUMENTS

| | | | | |
|---|---|---|---|---|
| 2004/0071140 | A1* | 4/2004 | Jason | H04L 47/10 370/392 |
| 2004/0213291 | A1* | 10/2004 | Beshai | H04L 47/10 370/473 |
| 2006/0245384 | A1* | 11/2006 | Talukdar | H04L 1/0041 370/310 |
| 2006/0268837 | A1* | 11/2006 | Larsson | H04L 1/0003 370/352 |
| 2006/0269005 | A1* | 11/2006 | Laroia | H04B 14/026 375/260 |
| 2010/0166015 | A1* | 7/2010 | van Greunen | H04L 1/0007 370/474 |
| 2014/0169162 | A1* | 6/2014 | Romano | H04L 47/2416 370/230 |

\* cited by examiner

COMMUNICATION CONTROL APPARATUS, COMMUNICATION CONTROL SYSTEM, COMMUNICATION CONTROL METHOD, AND RECORDING MEDIUM

CROSS-REFERENCE TO RELATED APPLICATION

This application is based upon and claims the benefit of priority of the prior Japanese Patent Application No. 2017-098344, filed on May 17, 2017, the entire contents of which are incorporated herein by reference.

FIELD

The embodiments discussed herein are related to a communication control apparatus, a communication control system, a communication control method, and recording medium.

BACKGROUND

In recent years, Internet of Things (IoT) networks are spreading. Often IoT connects devices such as sensors and gateways (GWs) using short-range wireless communication such as Bluetooth (registered trademark) and ZigBee (registered trademark) to construct a sensor network. However, sensor networks may suffer from failures due to external environmental changes or device malfunctions. When a failure occurs in the sensor network, it is difficult to collect user data (for example, temperature, humidity, and power generation amount) used by various IoT services. Therefore, it is important to collect data by stable operation of an IoT network.

For a solution, in the IoT network, in addition to the user data as mentioned above, operation management data contributing to the judgment on the communication status is sampled to detect a failure and to determine the content of the failure and the occurrence location. The operation management data is, for example, data indicating a device state for each device, including the wireless quality between devices, the usage status of a central processing unit (CPU) and a memory, and a battery remaining amount of each device. However, among such operation management data, data regarding the wireless quality varies exceptionally rapidly. Therefore, in order to constantly grasp the behavior of a wireless channel, the data regarding the wireless quality is sampled by each device at a short cycle at about several hundred millisecond intervals and transmitted to a GW. In particular, Bluetooth and ZigBee which are frequently used in the IoT network have an exceedingly narrow occupied bandwidth per channel as compared with a wireless local area network (LAN) or the like. Therefore, each device is desired to transmit data to the GW with high efficiency without any loss.

In order to cope with such a situation, a technique is known in which each device collectively transmits measurement data for a plurality of times with a maximum packet size allowed by a protocol. With this technique, high-efficiency data transmission with suppressed packet overhead is implemented.

Patent Document 1: Japanese Laid-open Patent Publication No. 2012-257016

However, when a plurality of devices transmits data with the maximum packet size, collision of packets is likely to occur between the devices, which increases the possibility of data loss. Therefore, even if the packet size is set to a maximum value, the data transmission efficiency does not necessarily increase. On the other hand, if data is transmitted with a smaller packet size, although the collision probability of the packets decreases, the overhead grows and the data transmission efficiency is lowered. Such a problem is particularly conspicuous in a narrowband IoT network.

SUMMARY

According to an aspect of the embodiment, a communication control apparatus includes: a processor configured to: fix a number of sets of data to be inserted into one packet by a communication apparatus according to a wireless quality with the communication apparatus; and notify the communication apparatus of the number of sets fixed at the fixing.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. Note that the communication control apparatus, the communication control system, the communication control program, and the communication control method disclosed by the present application are not restricted by the following embodiments.

Figure 1:
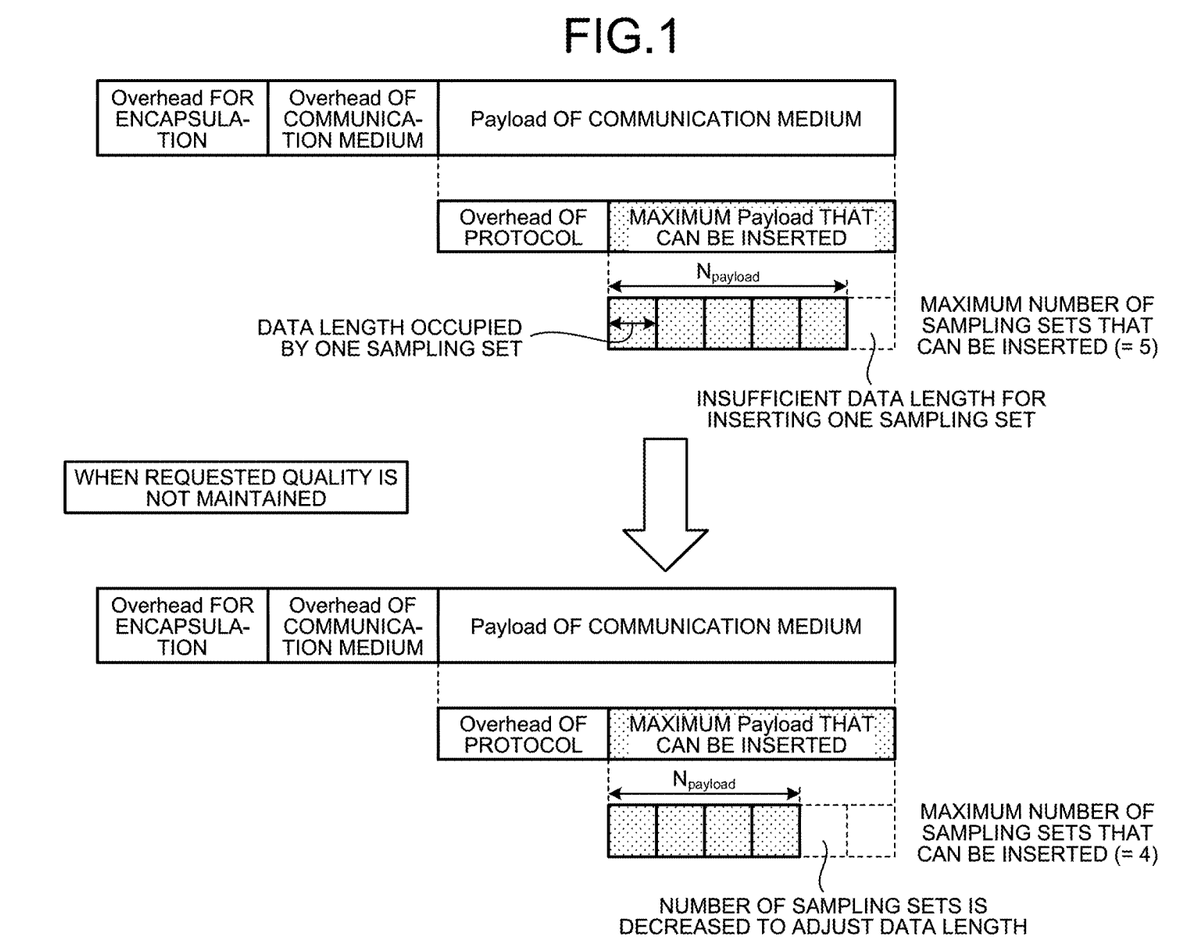
FIG. 1 is a diagram illustrating an example of an outline of a packet size adjustment method according to the present embodiments.

FIG. 1 is a diagram illustrating an example of an outline of a packet size adjustment method according to the present embodiments. As illustrated in FIG. 1, in the packet size adjustment method according to the present embodiments, operation management data is transmitted with a packet size that maximizes the transmission efficiency within a range where the quality of the data requested by a failure detection algorithm is maintained. The GW periodically monitors the quality of data with each device and determines whether a quality being requested is maintained. Then, when the quality being requested is not maintained, the GW makes the packet size smaller to improve the wireless quality. In the example illustrated in FIG. 1, when the requested wireless quality is not maintained, the number of sampling sets of the operation management data transmitted in one packet is changed, for example, from five to four. This makes the packet size smaller and makes it possible to reduce the probability of collision with packets transmitted from other devices.

Here, the sampling set indicates a data group (set) requested by the failure detection algorithm, which is obtained by gathering the operation management data of different classifications in sampling units. The operation management data is, for example, data indicating a device state for each device, including the wireless quality between devices, the usage status of a central processing unit (CPU) and a memory, and a battery remaining amount of each device. For example, a received signal strength indication (RSSI), a link quality indicator (LQI), or the like can be deemed as the wireless quality between devices. Note that it is also possible to more flexibly adjust the packet size when each device further divides one sampling set into a plurality of packets to transmit. However, the process of reading data in the device and the process of reconstructing data in the GW are complicated and there is a high possibility that it is not suitable for a device having low resources which is often used in IoT. Therefore, in the present embodiments, it is assumed that the packet size is adjusted in units of one sampling set.

Figure 2:
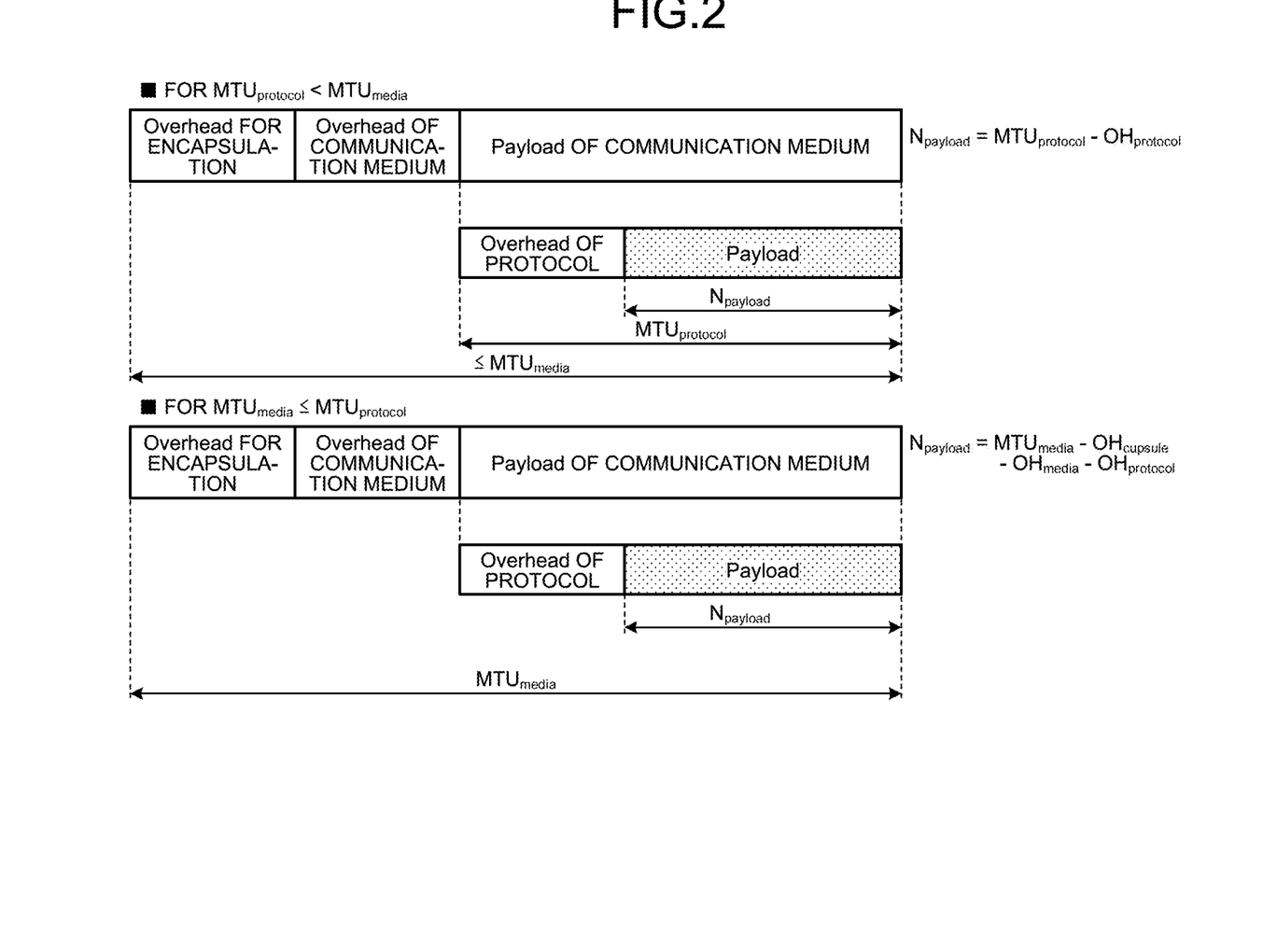
FIG. 2 is a diagram for explaining an example of a method of fixing a packet size according to the present embodiments.

FIG. 2 is a diagram for explaining an example of a method of fixing the packet size according to the present embodiments. For example, as illustrated in FIG. 2, $N_{payload}$ corresponding to the above-mentioned packet size is fixed by a magnitude relationship between a maximum transmission unit (MTU) of a communication medium and an MTU of a protocol. Here, the communication media (media) include, for example, Bluetooth, ZigBee, and a wireless LAN. The protocol is, for example, the home-network topology identifying protocol (HTIP) or the digital living network alliance (DLNA) (registered trademark).

In FIG. 2, $MTU_{protocol}$ represents the MTU of a communication protocol, whereas $MTU_{media}$ represents the MTU of the communication medium. In addition, $OH_{capsule}$ represents an overhead per transmission demanded for encapsulation such as generic routing encapsulation (GRE). $OH_{protocol}$ represents the overhead of the communication protocol and $OH_{media}$ represents the overhead of the communication medium. In a case where $MTU_{protocol}<MTU_{media}$ is established in fixing the packet size, the GW fixes $N_{payload}$ corresponding to the packet size by $N_{payload}=MTU_{protocol}-OH_{protocol}$. On the other hand, in a case where $MTU_{media} \leq MTU_{protocol}$ is established, the GW fixes $N_{payload}$ corresponding to the packet size by $N_{payload}=MTU_{media}-OH_{capsule}-OH_{media}-OH_{protocol}$. Consequently, appropriate $N_{payload}$ corresponding to the packet size according to the quality of data in a sensor network can be fixed.

Figure 3:
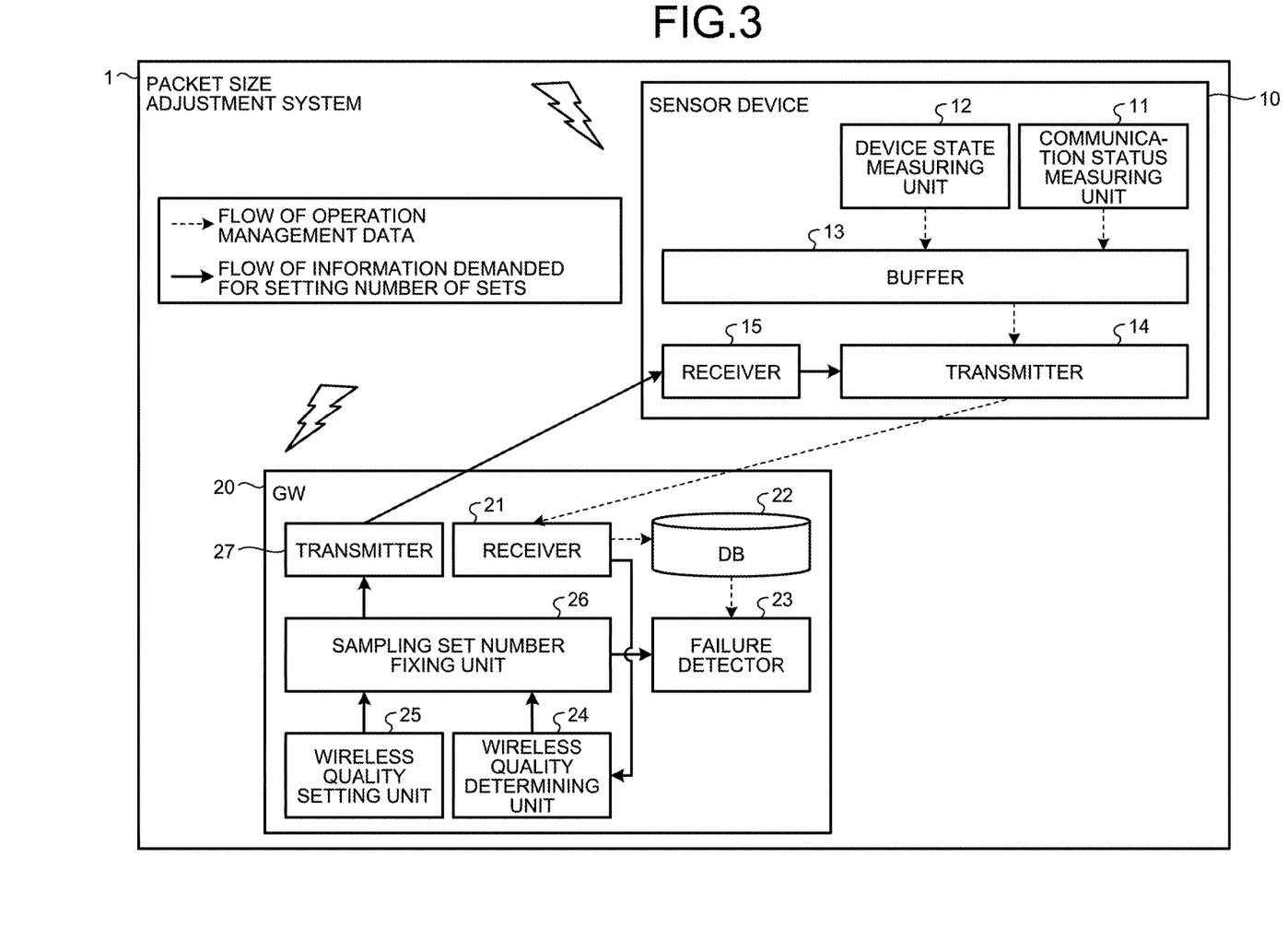
FIG. 3 is a diagram illustrating an example of a packet size adjustment system according to the present embodiments.

FIG. 3 is a diagram illustrating an example of a packet size adjustment system 1 according to the present embodiments. The packet size adjustment system 1 is an example of the communication control system. For example, as illustrated in FIG. 3, a sensor device 10 has a communication status measuring unit 11, a device state measuring unit 12, a buffer 13, a transmitter 14, and a receiver 15. These respective constituent members are connected in one direction or bidirectionally such that signals and packets can be input and output. Meanwhile, a gateway (GW) 20 has a receiver 21, a database (DB) 22, a failure detector 23, a wireless quality determining unit 24, a wireless quality setting unit 25, a sampling set number fixing unit 26, and a transmitter 27. These respective constituent members are connected in one direction or bidirectionally such that signals and packets can be input and output. In FIG. 3, broken line arrows indicate flows of the operation management data and solid line arrows indicate flows of information demanded for setting the number of sampling sets. The communication status measuring unit 11 is an example of a measuring unit. In addition, the wireless quality determining unit 24 is an example of a determining unit. The sampling set number fixing unit 26 is an example of a fixing unit. The transmitter 27 is an example of a notifying unit.

Although the process of each constituent member will be described later in the explanation of the action, for example, the communication status measuring unit 11 of the sensor device 10 measures data representing a communication status, such as the RSSI or the LQI, among the operation management data and accumulates resultant measured data in the buffer 13. Likewise, the device state measuring unit 12 measures data representing the device state, such as the usage status of the CPU and the memory and the battery remaining amount, among the operation management data and accumulates resultant measured data in the buffer 13.

Figure 4:
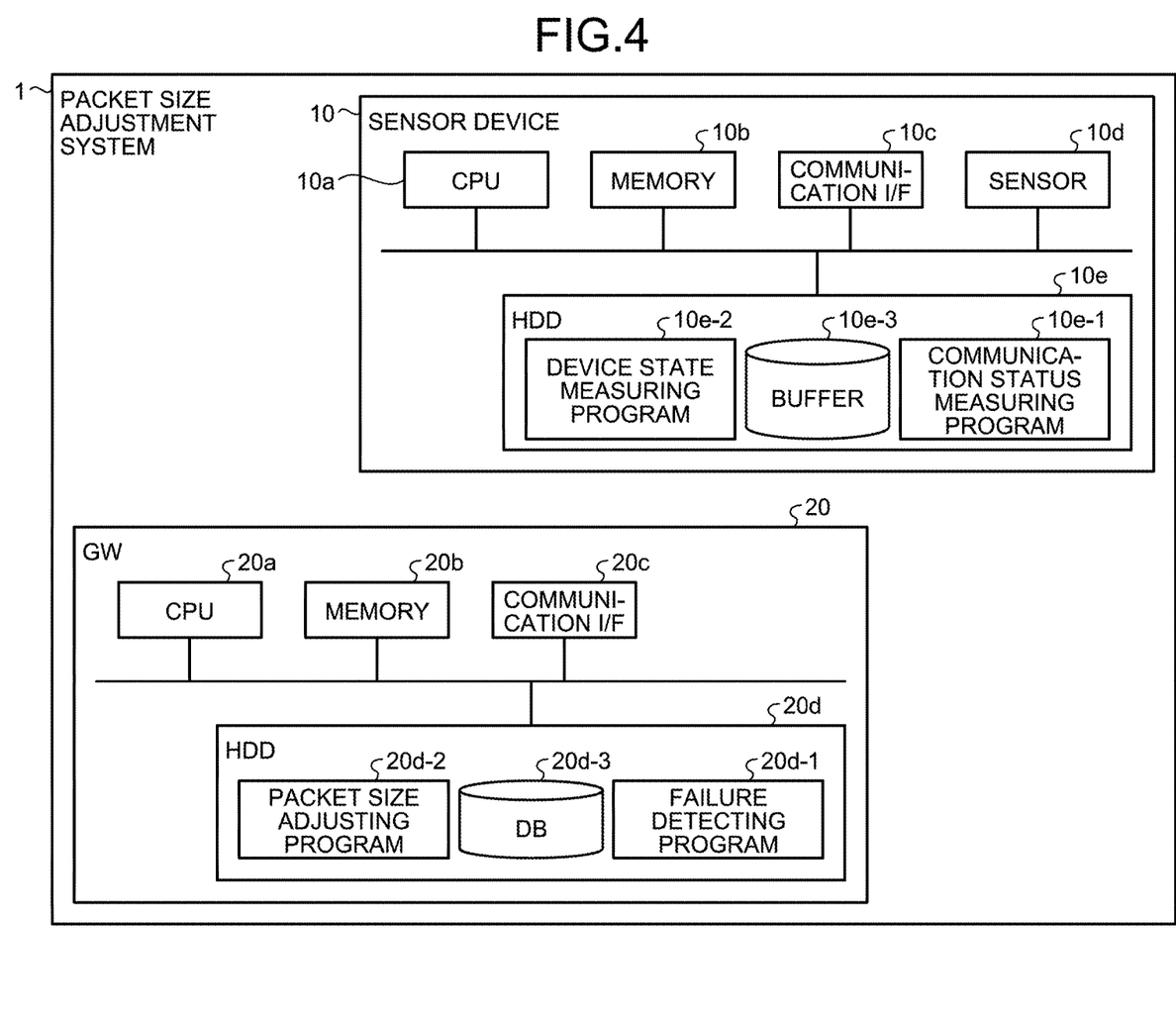
FIG. 4 is a diagram illustrating an example of hardware of the packet size adjustment system according to the present embodiments.

FIG. 4 is a diagram illustrating a hardware configuration of the packet size adjustment system 1 according to the present embodiments. As illustrated in FIG. 4, the sensor device 10 has a CPU 10a, a memory 10b, a communication interface (I/F) 10c, a sensor 10d, and a hard disk drive (HDD) 10e as hardware constituent elements. The memory 10b is, for example, a random access memory (RAM) such as a synchronous dynamic random access memory (SDRAM), a read only memory (ROM), or a flash memory.

The CPU 10a executes various types of arithmetic processes. The communication I/F 10c performs wireless communication with the GW 20 and transmits and receives data to and from the GW 20. The memory 10b temporarily stores various types of information. A communication status measuring program 10e-1 and a device state measuring program 10e-2 are saved In the HDD 10e.

The CPU 10a reads the communication status measuring program 10e-1 from the HDD 10e to load in the RAM in the memory 10b as a communication status measuring process. Then, the CPU 10a implements the function of the communication status measuring unit 11 in cooperation with the sensor 10d by executing the communication status measuring process loaded in the RAM. The CPU 10a also reads the device state measuring program 10e-2 from the HDD 10e to load in the RAM in the memory 10b as a device state measuring process. Then, the CPU 10a implements the function of the device state measuring unit 12 in cooperation with the sensor 10d by executing the device state measuring process loaded in the RAM. In addition, the buffer 13 is implemented by, for example, the HDD 10e. The transmitter 14 and the receiver 15 are implemented by, for example, the communication I/F 10c.

Note that the communication status measuring program 10e-1 and the device state measuring program 10e-2 are not necessarily saved in the HDD 10e from the beginning. For example, the CPU 10a may read the communication status measuring program 10e-1 and the device state measuring program 10e-2 stored in a storage medium such as a memory card from the storage medium to execute. Alternatively, these programs may be stored in a computer (or server) or the like connected to the sensor device 10 via a wireless line, a public line, the Internet, a LAN, a wide area network (WAN), or the like. In this case, the CPU 10a of the sensor device 10 acquires these programs from the computer via a wireless line or the like to execute.

As illustrated in FIG. 4, the GW 20 has a CPU 20a, a memory 20b, a communication I/F 20c, and an HDD 20d as hardware constituent elements. The memory 20b is, for example, a RAM such as an SDRAM, a ROM, or a flash memory. The CPU 20a executes various types of arithmetic processes. The communication I/F 20c performs wireless communication with the sensor device 10 and transmits and receives data to and from the sensor device 10. The memory 20b temporarily stores various types of information.

A failure detecting program 20d-1 and a packet size adjusting program 20d-2 are saved in the HDD 20d. In addition, data such as user data, the operation management data, the number of sampling sets, and a threshold value for wireless quality determination is saved in the HDD 20d. The CPU 20a reads the failure detecting program 20d-1 from the HDD 20d to load in the RAM in the memory 20b as a failure detecting process. Then, the CPU 10a implements the function of the failure detector 23 by executing the failure detecting process loaded in the RAM. The CPU 20a also reads the packet size adjusting program 20d-2 from the HDD 20d to load in the RAM in the memory 20b as a packet size adjusting process. Then, by executing the packet size adjusting process loaded in the RAM, the CPU 10a implements the function of each of the wireless quality determining unit 24, the wireless quality setting unit 25, and the sampling set number fixing unit 26. Additionally, the receiver 21 and the transmitter 27 are implemented by, for example, the communication I/F 20c. The DB 22 is implemented by, for example, the HDD 20d.

Note that the failure detecting program 20d-1 and the packet size adjusting program 20d-2 are not necessarily saved in the HDD 20d from the beginning. For example, the CPU 20a may read the failure detecting program 20d-1 and the packet size adjusting program 20d-2 stored in a storage medium such as a memory card from the storage medium to execute. Alternatively, these programs may be stored in a computer (or server) or the like connected to the GW 20 via a wireless line, a public line, the Internet, a LAN, a WAN, or the like. In this case, the CPU 20a of the GW 20 acquires these programs from the computer via a wireless line or the like to execute.

Next, the action of the GW 20 will be described with reference to a flowchart illustrated below, together with FIG. 3.

[a] First Embodiment

Figure 5:
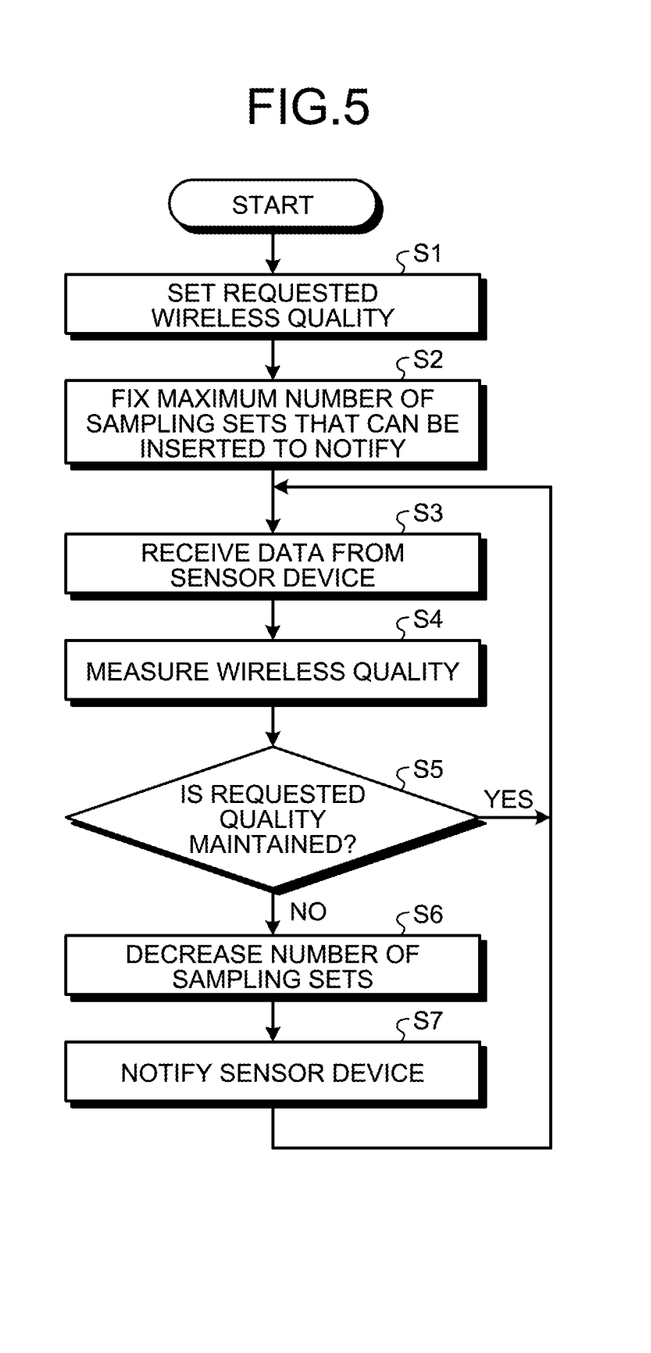
FIG. 5 is a flowchart for explaining an example of the action of a GW according to a first embodiment.

FIG. 5 is a flowchart for explaining an example of the action of the GW 20 according to a first embodiment. First, the wireless quality setting unit 25 is set with a requested quality indicating a wireless quality requested for executing failure detection in a wireless communication line between the GW 20 and each device 10 by, for example, an administrator of the packet size adjustment system 1 (S1).

Next, based on a wireless communication scheme to be used, the MTU of a sensor network standard protocol, and the data length of the operation management data to be transmitted, the sampling set number fixing unit 26 fixes the maximum number of sampling sets that can be inserted into one packet. For example, as illustrated in FIG. 1, the maximum number of sampling sets that can be inserted into one packet is fixed to "5". Thereafter, the sampling set number fixing unit 26 notifies the sensor device 10 of the fixed number of sampling sets via the transmitter 27 (S2). From the viewpoint of stably operating the sensor network, for example, the HTIP and the DLNA are preferable for the protocol used for notifying the number of sampling sets, but other protocols may be employed.

Next, the receiver 15 of the sensor device 10 receives a notification regarding the number of sampling sets transmitted from the GW 20. Then, the transmitter 14 of the sensor device 10 acquires the operation management data for the number of sampling sets notified from the GW 20 from the buffer 13. Thereafter, the transmitter 14 inserts the acquired operation management data into one packet to transmit to the GW 20. The receiver 21 of the GW 20 receives the operation management data for one packet transmitted from the sensor device 10 (S3). Then, the receiver 21 saves the received operation management data in the DB 22.

Next, the wireless quality determining unit 24 measures the wireless quality at the time of receiving data from the sensor device 10 (S4) every time a predetermined time elapses or a predetermined number of packets is received. In the present embodiment, the wireless quality determining unit 24 measures a packet error rate (PER) of the packet received from the sensor device 10 as the wireless quality at the time of receiving data from the sensor device 10. Then, the wireless quality determining unit 24 outputs the measured wireless quality to the sampling set number fixing unit 26. The sampling set number fixing unit 26 compares the requested quality set in the wireless quality setting unit 25 in step S1 with the wireless quality output from the wireless quality determining unit 24 and determines whether the requested quality set in the wireless quality setting unit 25 is maintained (S5).

When it is determined that the requested quality set in the wireless quality setting unit 25 is maintained (S5; Yes), the process indicated in step S3 is executed again. That is, the receiver 21 receives the operation management data from the sensor device 10 and saves the received data in the DB 22.

On the other hand, when it is determined that the requested quality set in the wireless quality setting unit 25 is not maintained (S5; No), the sampling set number fixing unit 26 decreases the current number of sampling sets by, for example, one (S6). As a result, the maximum number of sampling sets that can be inserted into one packet decreases, for example, from "5" to "4". Thereafter, the sampling set number fixing unit 26 notifies the sensor device 10 of the decreased number of sampling sets via the transmitter 27 (S7). Then, the process indicated in step S3 is executed again.

Note that, when the number of sampling sets before decreasing is one, the sampling set number fixing unit 26 may maintain the number of sampling sets without decreasing. In this case, the sensor device 10 continues to transmit the data to the GW 20 while keeping the number of sampling sets previously notified. Furthermore, the sampling set number fixing unit 26 may notify the failure detector 23 that the requested quality set in the wireless quality setting unit 25 is difficult to maintain.

The first embodiment has been described thus far. As is apparent from the above description, the packet size adjustment system 1 has the sensor device 10 and the GW 20 that receives data from the sensor device 10. The GW 20 has the sampling set number fixing unit 26 and the transmitter 27. The sampling set number fixing unit 26 fixes the number of sets (packet size) of the operation management data to be inserted into one packet by the sensor device 10 depending on whether the wireless quality with the sensor device 10 maintains the requested wireless quality. The transmitter 27 notifies the sensor device 10 of the number of sets fixed by the sampling set number fixing unit 26. The sensor device 10 has the communication status measuring unit 11 and the transmitter 14. The communication status measuring unit 11 measures the communication status such as the RSSI and the LQI with another sensor device 10. When transmitting the operation management data indicating the result of the above measurement, the transmitter 14 inserts the operation management data for the maximum number of sampling sets that can be inserted into the packet, which has been notified from the transmitter 27 of the GW 20, into one packet to transmit to the GW 20.

In addition, in the packet size adjustment system 1 according to the first embodiment, the GW 20 may further has the wireless quality determining unit 24 that determines whether the wireless quality with the sensor device 10 satisfies the requested quality. The sampling set number fixing unit 26 may decrease the number of sets of the operation management data when the wireless quality determining unit 24 determines that the wireless quality with the sensor device 10 does not satisfy the requested quality.

As described above, in a narrowband IoT network, when a plurality of sampling results are gathered to be transmitted with a large packet size, the possibility of packet collision increases, while the overhead becomes larger and the efficiency deteriorates when each sampling result is transmitted with a small packet size. Therefore, in a case where it is difficult to maintain the data reception quality at a predetermined quality when each sensor devices 10 gathers a plurality of sampling sets to transmit, the GW 20 according to the present embodiment decreases the number of sampling sets to adjust the data length. With this configuration, the packet size adjustment system 1 of the present embodiment can enhance both the data transmission efficiency and the data reception quality at the same time.

Here, maintaining the data reception quality at a predetermined quality means that the packet collision probability is reduced to a predetermined value or less. Therefore, the GW 20 according to the present embodiment can transmit data (especially data regarding the wireless quality among the operation management data) to the GW with as large a size as possible while suppressing the packet collision probability. That is, in a case where it is difficult to maintain the data reception quality at a predetermined quality when the sensor device 10 transmits data to the GW 20, the packet size is decreased to the maximum packet size at which the packet collision probability is regulated to a predetermined value or less during transmission. With this configuration, the packet size adjustment system 1 can efficiently collect data while maintaining the wireless quality demanded for failure detection. As a result, stable collection of the operation management data is implemented.

[b] Second Embodiment

Next, a second embodiment will be described. The configuration of a packet size adjustment system 1 according to the second embodiment is similar to the configuration of the packet size adjustment system 1 according to the first embodiment illustrated in FIGS. 3 and 4. Accordingly, common constituent elements are denoted by the same numerals and illustration and detailed explanation thereof will be omitted. Hereinafter, the action of the packet size adjustment system 1 according to the second embodiment will be described with reference to FIG. 6, focusing on differences from the first embodiment.

Figure 6:
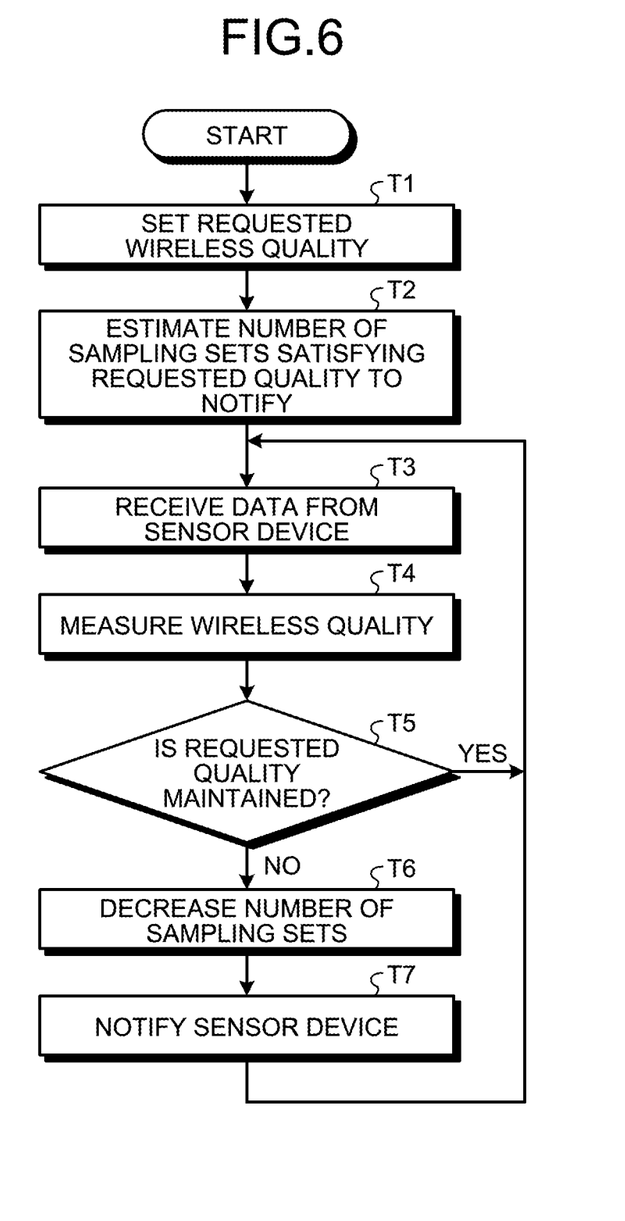
FIG. 6 is a flowchart for explaining an example of the action of a GW according to a second embodiment.

FIG. 6 is a flowchart for explaining an example of the action of a GW 20 according to the second embodiment. Since FIG. 6 includes a plurality of processes similar to those in FIG. 5 referred to in the explanation of the action of the first embodiment, common steps are denoted by reference numerals having the same final letters and the detailed description thereof will be omitted. Specifically, since the processes in steps T1 and T3 to T7 in FIG. 6 correspond to the processes in steps S1 and S3 to S7 illustrated in FIG. 5, respectively, a detailed description thereof will be omitted.

The sampling set number fixing unit 26 of the first embodiment fixes the maximum number of sampling sets that can be inserted into a packet as illustrated in step S2 of FIG. 5 as an example. In contrast, as illustrated in step T2 of FIG. 6 as an example, a sampling set number fixing unit 26 of the second embodiment estimates the number of sampling sets satisfying the requested quality based on the wireless quality of a packet transmitted from each sensor device 10. In the present embodiment, the wireless quality is the PER of a packet received from each sensor device 10. Note that the wireless quality may be a PER measured by each sensor device 10. For example, the PER is represented by the following mathematical expression (1) using a bit error rate (BER).

$$PER = 1 - (1 - BER)^N \quad (1)$$

In the above mathematical expression (1), N represents a packet length (the unit is bit).

Here, supposing that BER<<1, the above mathematical expression (1) can be represented by the following mathematical expression (2).

$$PER \approx 1 - (1 - N \cdot BER) \quad (2)$$
$$\approx N \cdot BER$$

In estimating the number of sampling sets, the sampling set number fixing unit 26 first measures the PER of the packet received from the sensor device 10. Note that the sampling set number fixing unit 26 may use, for example, a PER measured by the sensor device 10, which is included in the operation management data collected from the sensor device 10.

The BER can be estimated as indicated by the following mathematical expression (3), using a maximum value $N_{max}$ (the unit is bit) of the packet length, a $PER_{measured}$ which is the measured PER, and the above mathematical expression (2).

$$BER = PER_{measured}/N_{max} \quad (3)$$

Here, supposing that the BER does not vary in a short time, the packet length N satisfying a $PER_{requested}$ which is a quality requested for the data can be represented by the following mathematical expression (4) by the above mathematical expression (2).

$$N = PER_{requested}/BER \quad (4)$$

As indicated by the above mathematical expression (4), the packet length N becomes shorter as the $PER_{requested}$ corresponding to the wireless quality is lowered. In addition, it can be seen that the increase/decrease quantity of the packet length N also varies according to the increase/decrease quantity of the wireless quality. Specifically, the value of the packet length N is proportional to the value of the $PER_{requested}$ as the wireless quality.

Accordingly, in step T2, by applying the $N_{max}$, the $PER_{measured}$, and the $PER_{requested}$ to the above mathematical expressions (3) and (4), the sampling set number fixing unit 26 can estimate the packet length N satisfying the $PER_{requested}$ which is a quality requested for the data. Then, the sampling set number fixing unit 26 notifies the sensor device 10 of the number of sampling sets that implements a packet length not exceeding the estimated packet length N via the transmitter 27 (T2).

In the packet size adjustment system 1 according to the present second embodiment, the sampling set number fixing unit 26 estimates the number of sets with which the above-described wireless quality (for example, the PER) satisfies the requested quality and fixes the estimated number of sets as the number of sets to be notified to the sensor device 10. With the packet size adjustment system 1 according to the present second embodiment, the GW 20 can designate an initial value of the number of sampling sets as a value close to the maximum number of sampling sets satisfying the requested quality. Consequently, the GW 20 can allow the number of sampling sets to converge more quickly.

Note that the disclosed technique is not restricted to the above-described embodiments and a variety of modifications are possible within the scope of the gist thereof.

First Modification

For example, in the second embodiment, the packet error rate (PER) is used as an index for measuring the wireless quality when the GW 20 determines whether the requested quality is maintained. However, the index for measuring the wireless quality is not limited to this example and a numerical value correlated with the PER, such as the link quality indicator (LQI), may be used. Furthermore, the number of times of retransmission is decreased by suppressing the packet collision probability. Then, when the number of times of retransmission is decreased, the response time is shortened, which in turn leads to an enhancement in the wireless quality. Therefore, the response time of an ECHO packet transmitted to examine the reachability, or the like may be used as the index for measuring the wireless quality.

In addition, the GW 20 may use at least two indices in combination among these indices. For example, for each index, a threshold value of the index in a case where the packet collision probability is equal to or greater than a predetermined value is registered in the DB 22 in the GW 20, or the like in advance. Then, the wireless quality determining unit 24 determines, for each index, whether the value of the index exceeds the threshold value in a case where the packet collision probability is equal to or greater than the predetermined value. When the value of any index exceeds the threshold value, the sampling set number fixing unit 26 decreases the number of sampling sets by, for example, one. Thereafter, the sampling set number fixing unit 26 notifies the sensor device 10 of the decreased number of sampling sets. Note that the sampling set number fixing unit 26 may decrease the number of sampling sets by, for example, one when the values of all indices exceed the threshold value. Furthermore, the sampling set number fixing unit 26 may weight the indices as appropriate when combining the indices.

In the packet size adjustment system 1 according to the present first modification, the LQI is used as an index representing the wireless quality, whereby the wireless state between the GW 20 and the sensor device 10 can be accurately reflected to the number of sampling sets.

Second Modification

In the second embodiment, when determining whether the requested quality is maintained, the GW 20 uses the operation management data transmitted from the sensor device 10 immediately before the timing of the determination. However, the disclosed technique is not limited to this example. For example, the determination may be made based on not only the operation management data transmitted from the sensor device 10 immediately before the determination timing but also the operation management data for a plurality of times of sampling. That is, the determination as to whether the wireless quality between the sensor device 10 and the GW 20 satisfies the quality being requested may be made based on the operation management data for a plurality of times of past sampling including the operation management data transmitted from the sensor device 10 immediately before the timing of the determination.

In such an aspect, the GW 20 can appropriately select a determination method suitable for the index according to the index to be used. For example, when using the operation management data for a plurality of times of sampling, the GW 20 can made the determination in consideration of statistical values such as an average value, a median value, and a standard deviation, the slope of a regression line, the occurrence frequency of an outlier, and the like.

In the present second modification, the wireless quality determining unit 24 determines whether the wireless quality satisfies the requested quality based on the operation management data for a plurality of times of sampling including the operation management data transmitted from the sensor device 10 immediately before the timing of the determination. With the packet size adjustment system 1 according to the present second modification, the GW 20 can more accurately determine whether the requested quality is maintained.

In each of the embodiments and the modifications described above, Bluetooth, ZigBee, the wireless LAN are exemplified as the communication medium (wireless communication scheme) between the sensor device 10 and the GW 20, but the disclosed technique is not limited thereto. For example, the infrared data association (IrDA), the near field communication (NFC), or the like may be used as the communication medium between the sensor device 10 and the GW 20.

In addition, each constituent element of the GW 20 does not necessarily have to be physically configured as illustrated in the drawings. In other words, specific aspects of distribution and integration of respective apparatuses are not limited to the ones illustrated in the drawings. Therefore, all or part thereof can be functionally or physically distributed or integrated in any unit depending on various types of loads, usage, and the like. For example, the wireless quality determining unit 24 and the wireless quality setting unit 25 or the wireless quality determining unit 24 and the sampling set number fixing unit 26 of the GW 20 may be integrated as one constituent element. Conversely, for example, the sampling set number fixing unit 26 of the GW 20 may be distributed to a section that fixes the maximum number of sampling sets that can be inserted into a packet and a section that estimates the number of sampling sets satisfying the requested wireless quality. Furthermore, a storage apparatus such as the memory 20b may be connected as an external apparatus of the GW 20 by way of a network or a cable.

Additionally, the above description has explained the individual configuration and action for each embodiment and each modification. However, the communication control apparatus according to each embodiment and modification may also have a constituent element peculiar to another embodiment or modification. In addition, the combination of each embodiment and each modification is not limited to two and any form such as a combination of three or more can be adopted. For example, the determination method based on a plurality of times of sampling according to the second modification may be applied to the GW 20 according to the first embodiment. Furthermore, one GW 20 may simultaneously have all of the constituent elements described in the first and second embodiments and the first and second modifications.

In addition, in the GW 20 of each of the above-described embodiments, the sampling set number fixing unit 26 maintains the current number of sampling sets when it is determined that the requested quality set in the wireless quality setting unit 25 is maintained. However, the disclosed technique is not limited thereto. For example, when the quality of data measured by the wireless quality determining unit 24 is better than the requested quality by a predetermined quality or more, the sampling set number fixing unit 26 may raise the current number of sampling sets. With this configuration, when the quality of data measured by the wireless quality determining unit 24 fluctuates, the sampling set number fixing unit 26 can make the number of sampling sets larger within a range where the requested quality is satisfied. Accordingly, the GW 20 can increase the data collection efficiency while maintaining the data reception quality at a predetermined quality.

According to one aspect of a communication control apparatus disclosed in the present application, it is possible to efficiently collect data while maintaining a data reception quality at a predetermined quality.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication control apparatus comprising:
a processor configured to:
fix a number of sets of data to be inserted into one packet by a communication apparatus according to a wireless quality with the communication apparatus, the set is a data group requested by a failure detection algorithm, which is obtained by gathering operation management data of different classifications in sampling units;
determine, in consideration of a slope of a regression line, whether the wireless quality with the communication apparatus satisfies a requested quality based on the data for a plurality of times of sampling operation management data transmitted from the communication apparatus immediately before a timing of the determination;
decrease the number of sets when the wireless quality does not satisfy the requested quality; and
notify the communication apparatus of the number of sets fixed at the fixing.

2. The communication control apparatus according to claim 1, wherein the processor is further configured to estimate the number of sets with which the wireless quality satisfies the requested quality based on a quality of the packet transmitted from the communication apparatus and fix the estimated number of sets as the number of sets.

3. The communication control apparatus according to claim 1, wherein an index representing the wireless quality is a link quality indicator (LQI).

4. A communication control system comprising a communication apparatus and a communication control apparatus that receives data from the communication apparatus, wherein
the communication control apparatus includes:
a first processor configured to:
fix a number of sets of data to be inserted into one packet by the communication apparatus according to a wireless quality with the communication apparatus, the set is a data group requested by a failure detection algorithm, which is obtained by gathering operation management data of different classifications in sampling units;
determine, in consideration of a slope of a regression line, whether the wireless quality with the communication apparatus satisfies a requested quality based on the data for a plurality of times of sampling operation management data transmitted from the communication apparatus immediately before a timing of the determination;
decrease the number of sets when the wireless quality does not satisfy the requested quality; and
notify the communication apparatus of the number of sets fixed at the fixing, and
the communication apparatus includes:
a second processor configured to:
measure a communication status; and
insert the data for the number of sets notified at the notifying into one packet and transmit the packet to the communication control apparatus when transmitting the data indicating a result of the measurement.

5. A non-transitory computer-readable recording medium storing therein a communication control program that causes a computer to execute a process comprising:
fixing a number of sets of data to be inserted into one packet by a communication apparatus according to a wireless quality with the communication apparatus, the set is a data group requested by a failure detection algorithm, which is obtained by gathering operation management data of different classifications in sampling units;
determining, in consideration of a slope of a regression line, whether the wireless quality with the communication apparatus satisfies a requested quality based on the data for a plurality of times of sampling operation management data transmitted from the communication apparatus immediately before a timing of the determination;
decreasing the number of sets when the wireless quality does not satisfy the requested quality; and
notifying the communication apparatus of the fixed number of sets.

* * * * *